May 14, 1929.  W. U. STONEHILL  1,713,305
AUTOMOBILE SIGNAL
Filed Sept. 29, 1923

Inventor
Wmaloe U. Stonehill
By Chas J Williamson
Attorney

Patented May 14, 1929.

1,713,305

UNITED STATES PATENT OFFICE.

WINALOE U. STONEHILL, OF CINCINNATI, OHIO.

AUTOMOBILE SIGNAL.

Application filed September 29, 1923. Serial No. 665,657.

My invention relates to devices applied to automobiles by which automatically the intentions of the driver as to direction and stopping are signalled and my object is to provide a control device which will require a minimum of attention from the driver in the operation thereof and which will be simple in construction and thoroughly reliable in operation. My invention consists in whatever is described by or is included within the terms or scope of the appended claims.

Figure 1:
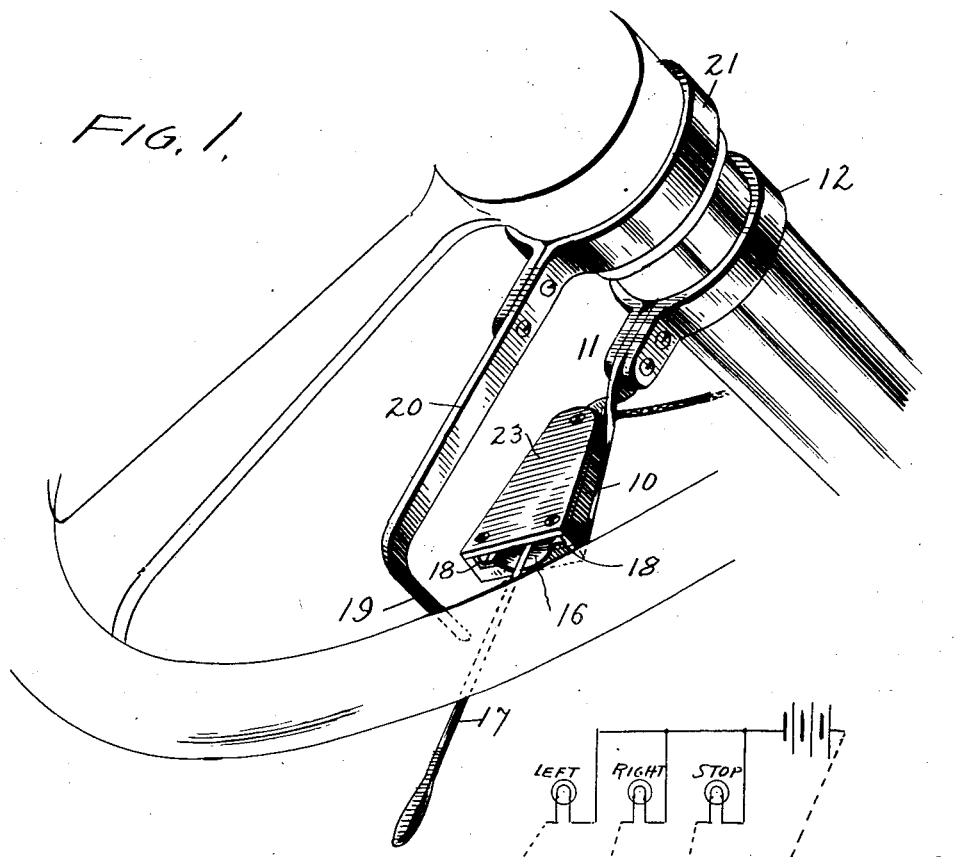
Fig. 1 is a perspective view of a device embodying my invention arranged for use.
Figure 2:
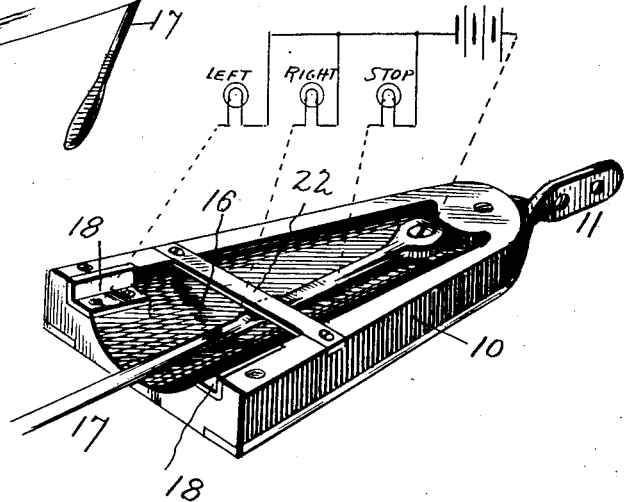
Fig. 2 is a similar view the parts of the casing being shown separated.

My invention comprehends a lamp arrangement suitably mounted on the car with signals to indicate right and left turns and stopping and a switch device at the steering wheel that has a movable contact arranged for successive cooperation with three fixed contacts that respectively are in circuit with the three lamps which give the direction and stop signals.

The switch comprises a base or supporting member, 10, which is of hard rubber or bakelite or other insulating material and a metal bracket, 11, attached to the underside thereof which at one end has a split ring clamp, 12, to encircle and to be clamped upon the steering post, 14, and thereby the switch is supported from the steering post and just below and quite close to the steering wheel, 15, with the base or support extending in a radial direction from the steering post. As a matter of compactness and attractive design the base, 10, is tapering in plan view with its wider end away from the steering post. Pivoted in a substantial recess or cavity, 16, in the upper side of the base, 10, is a rod, 17, of spring metal which constitutes the movable contact of the switch it being pivoted to the base near the steering post and having a length to reach the rim of the steering wheel or near enough to the rim of the steering wheel to enable the fingers to engage it to swing it horizontally without the necessity of removing the hand from the steering wheel. The surface of the cavity or recess is dished or concave so that it rises easily from a median line and as the movable contact is swung to one side or the other it engages the upwardly inclined surface and is thereby placed under sufficient tension or stress that when it reaches one or the other contacts, 18, for the right and left turn signal lamps it will be held thereat so that the concern of the motorist does not go beyond simply moving the contact as far as it will go to the right or to the left according to the direction signal that is to be given and when he has moved it as far as it can go he takes his finger therefrom and forgets it. Each fixed contact, 18, may be an angle strip of copper or brass with one flange horizontal and the other vertical, the vertical flange forming a stop to the swinging movement of the movable contact in the direction to close the circuit to one direction lamp or the other.

I use the turning of the steering wheel in the direction signaled to break the circuit so that the driver need give no thought to breaking the circuit through the lamp cut into the circuit and this may be conveniently done by a finger projecting from the underside of the steering wheel of a length to strike the movable contact rod only when the latter is in raised circuit closing position. Such finger, 19, may be a downward projection of a light bar, 20, projecting radially from the hub of the steering wheel from which it may be secured by a split clamp, 21. As will be obvious there will be two arms, 20, each having a finger, 19, so that by the turning of the steering wheel in either direction the switch arm, 17, will be engaged and shifted from the contact, 18, with which it happens to be engaged.

For closing the circuit through the stop lamp I employ a stationary contact, 22, in the form of a brass or copper strip which extends across the cavity in the base, 10, sufficiently above the movable contact as not to be touched by the latter unless it is purposely lifted high enough for that purpose by the fingers of the driver.

The upper side of the base, 10, is covered by a removable cap, 23, which houses and otherwise protects the switch contacts.

The lead wire from the movable contact extends from the pivot thereof to a suitable ground.

What I claim is:

1. A signal operating switch for automobiles comprising a suitable support, a movable contact pivoted to said support and movable also in a direction at right angles to the direction of its pivotal movement, a plurality of contacts with which said movable contact may be alternately engaged mounted spaced apart on opposite sides of said movable contact in the direction of pivotal movement thereof, and means actuated by the steering wheel to disengage said movable contact from such of the plurality of contacts which it may engage.

2. A signal operating switch for automobiles comprising a suitable support, a movable contact pivoted to said support and movable also in a direction at right angles to the direction of its pivotal movement, a plurality of contacts mounted spaced apart on opposite sides of said movable contact in the direction of its pivotal movement and means actuated by the steering wheel to disengage said movable contact from such of the plurality of contacts which it may engage, and another contact towards and from which the movable contact is movable at right angles to its pivotal movement.

3. A signal operating switch for automobiles comprising a base, a movable contact formed of a spring rod pivoted in a recess in such base, and fixed contacts on opposite sides of the recess in said base being in a plane higher than the bottom of the recess between them, said rod when in contact with either of said fixed contacts remaining in such contact.

4. A signal operating switch for automobiles comprising a base, a movable contact formed of a spring rod pivoted in a recess in such base, fixed contacts on opposite sides of the recess in said base being in a plane higher than the bottom of the recess between them, said rod when in contact with either of said fixed contacts remaining in such contact, and another contact reaching across such recess above said movable contact.

5. A signal operating switch for automobiles comprising a base, means for supporting the base in a plane below and parallel with the plane of the steering wheel of an automobile, said base having a recess that extends radially of said wheel, a movable contact formed of a spring rod pivoted at the inner end and fixed contacts on opposite sides of the recess in said base in a higher plane than the bottom of the recess between such contacts, such fixed contacts having horizontal surfaces which form bearings for the rod when placed in contact therewith, the spring of the rod maintaining the same in contact therewith until displaced by the operator.

In testimony whereof I hereunto affix my signature.

WINALOE U. STONEHILL.